(12) United States Patent
Motoyama (10) Patent No.: US 7,703,125 B2
(45) Date of Patent: Apr. 20, 2010

(54) APPROACH FOR DELETING ELECTRONIC DOCUMENTS ON NETWORK DEVICES USING DOCUMENT RETENTION POLICIES

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 1218 days.

(21) Appl. No.: 11/182,870

(22) Filed: Jul. 14, 2005

(65) Prior Publication Data

US 2006/0156382 A1     Jul. 13, 2006

Related U.S. Application Data

(63) Continuation-in-part of application No. 11/034,483, filed on Jan. 12, 2005.

(51) Int. Cl.
*G06F 17/00* (2006.01)
(52) U.S. Cl. ........................... 726/1; 715/255
(58) Field of Classification Search ........................ None
See application file for complete search history.

(56) References Cited

U.S. PATENT DOCUMENTS

| | | | |
|---|---|---|---|
| 4,426,680 A | 1/1984 | Tague et al. | |
| 4,451,742 A | 5/1984 | Aswell | |
| 4,584,641 A | 4/1986 | Guglielmino | |
| 4,639,864 A | 1/1987 | Katzman et al. | |
| 5,007,053 A | 4/1991 | Iyer et al. | |
| 5,130,922 A | 7/1992 | Liu | |
| 5,265,159 A | 11/1993 | Kung | |
| 5,313,632 A | 5/1994 | Sekizawa et al. | |
| 5,325,523 A | 6/1994 | Beglin et al. | |
| 5,359,713 A | 10/1994 | Moran et al. | |
| 5,375,227 A | 12/1994 | Akatsu et al. | |
| 5,388,156 A | 2/1995 | Blackledge, Jr. et al. | |
| 5,414,827 A | 5/1995 | Lin | |
| 5,428,766 A | 6/1995 | Seaman | |

(Continued)

FOREIGN PATENT DOCUMENTS

WO     WO 97/30447 A1     8/1997

OTHER PUBLICATIONS

IBM Corp., "Encryption Key Security by Electric Field Destruction of Memory Cells," IBM Technical Disclosure Bulletin, vol. 31, No. 8, Jan. 1989, 7 pages.

(Continued)

*Primary Examiner*—Brandon S Hoffman
(74) *Attorney, Agent, or Firm*—Hickman Palermo Truong & Becker LLP; Edward A. Becker (57) ABSTRACT

An approach is provided for deleting electronic documents using a document retention policy that specifies one or more deletion criteria for documents belonging to each of a plurality of document classifications. The document retention policy is defined by document retention policy data that is managed by a document retention policy manager. The document retention policy manager disseminates the document retention policy data to network elements over a communications network. The document retention policy manager determines whether a retention policy audit should be performed and if so, signals the network elements to conduct a retention policy audit. The network elements are configured to conduct the retention policy audit by deleting electronic documents in accordance with the document retention policy. Automatic or manual loading or auto-destruction code may be used to handle deleting electronic documents from removable media.

36 Claims, 8 Drawing Sheets

U.S. PATENT DOCUMENTS

| | | |
|---|---|---|
| 5,438,674 A | 8/1995 | Keele et al. |
| 5,448,719 A | 9/1995 | Schult et al. |
| 5,457,748 A | 10/1995 | Bergum et al. |
| 5,469,573 A | 11/1995 | McGill, III et al. |
| 5,475,834 A | 12/1995 | Anglin et al. |
| 5,499,012 A | 3/1996 | Tracy et al. |
| 5,515,540 A | 5/1996 | Grider et al. |
| 5,544,356 A | 8/1996 | Robinson et al. |
| 5,630,044 A | 5/1997 | Suzuki |
| 5,638,509 A | 6/1997 | Dunphy et al. |
| 5,652,830 A | 7/1997 | Yamamoto et al. |
| 5,664,089 A | 9/1997 | Byers et al. |
| 5,682,471 A | 10/1997 | Billings et al. |
| 5,761,705 A | 6/1998 | DeKoning et al. |
| 5,787,247 A | 7/1998 | Norin et al. |
| 5,835,953 A | 11/1998 | Ohran |
| 5,913,025 A | 6/1999 | Higley et al. |
| 5,933,584 A | 8/1999 | Maniwa |
| 5,943,688 A | 8/1999 | Fisher et al. |
| 5,991,895 A | 11/1999 | Laudon et al. |
| 6,006,311 A | 12/1999 | Arimilli et al. |
| 6,009,500 A | 12/1999 | Rossi |
| 6,035,379 A | 3/2000 | Raju et al. |
| 6,088,815 A | 7/2000 | West et al. |
| 6,092,173 A | 7/2000 | Sasaki et al. |
| 6,119,209 A | 9/2000 | Bauman et al. |
| 6,138,125 A | 10/2000 | DeMoss |
| 6,185,507 B1 | 2/2001 | Huber et al. |
| 6,301,670 B1 | 10/2001 | Motoyama et al. |
| 6,304,948 B1 | 10/2001 | Motoyama et al. |
| 6,665,082 B1 | 12/2003 | Takeoka et al. |
| 6,915,435 B1 | 7/2005 | Merriam |
| 2002/0010708 A1 | 1/2002 | McIntosh |
| 2002/0194014 A1 | 12/2002 | Starnes et al. |
| 2004/0186836 A1 | 9/2004 | Schlesinger |
| 2005/0055518 A1 | 3/2005 | Hochberg et al. |
| 2005/0114672 A1* | 5/2005 | Duncan et al. .............. 713/182 |
| 2005/0223414 A1 | 10/2005 | Kenrich et al. |
| 2006/0010301 A1* | 1/2006 | Yagawa ...................... 711/163 |

OTHER PUBLICATIONS

Santry, et al., Deciding when to forget in the Elephant file system, Dec. 1999, ACM SIGOPS Operating Systems Review, vol. 33, Issue 5, pp. 110-123.

* cited by examiner

| DOCUMENT CLASSIFICATION | DELETION CRITERIA | DOCUMENT TYPES | CLASSIFICATION DESCRIPTION |
|---|---|---|---|
| P0 | NONE | O | PUBLISHED TO OUTSIDE |
| L1 | 5 YEARS | O | MEETING RECORDS |
| L2 | 7 YEARS | O | ACCOUNTING RECORDS |
| C1 | 5 YEARS | O & P | GENERAL DOCUMENTS |
| C2 | 3 YEARS | O | GENERAL MEETING RECORDS |
| C3 | 1 YEAR | O | TEMPORARY DOCUMENTS |
| C4 | END OF PROJECT | O | PROJECT "A" DATA |

FILE INFORMATION TABLE

| FILE NAME | CREATION DATE | LOCATION | CLASSIFICATION |
|---|---|---|---|
| F1 | XX/YY/ZZ | L | L2 |
| F2 | XX/YY/ZZ | L | C2 |
| F3 | XX/YY/ZZ | L | C4 |
| F4 | XX/YY/ZZ | R | C3 |
| F5 | XX/YY/ZZ | L | P0 |
| C3 | XX/YY/ZZ | R | L1 |
| C4 | XX/YY/ZZ | O | L1 |

APPROACH FOR DELETING ELECTRONIC DOCUMENTS ON NETWORK DEVICES USING DOCUMENT RETENTION POLICIES

RELATED APPLICATIONS

This application is a continuation-in-part of and claims priority to U.S. patent application Ser. No. 11/034,483, filed on Jan. 12, 2005, entitled "Approach For Deleting Electronic Documents On Network Devices Using Document Retention Policies", the contents of which are hereby incorporated by reference in their entirety for all purposes.

This application is related to U.S. patent application Ser. No. 09/947,164, now issued as U.S. Pat. No. 6,874,092, entitled "Method and Apparatus For Erasing Data After Tampering", and filed on Sep. 4, 2001.

FIELD OF THE INVENTION

This invention relates generally to electronic document management, and more specifically, to an approach for deleting electronic documents on network devices using document retention policies.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Many businesses have implemented document retention policies to define conditions under which documents are to be destroyed. Businesses typically destroy documents to reduce costs attributable to maintaining old documents and to reduce potential legal liability. Document retention policies may apply to physical documents as well as electronic documents.

One of the problems with document retention policies is the difficulty in uniformly applying a document retention policy to all copies of a particular document. For example, a document retention policy may specify the destruction of a particular document after a specified time. Some copies of the particular document may be readily obtained and destroyed. Other copies of the particular document may exist but may be difficult to locate. For example, copies of the particular document may have been sent to remote storage and may be difficult, if not impossible, to locate. In other situations, the existence of some copies of the particular document may not even be known. This may occur, for example, if copies of the particular document were made, but no record was made documenting that the copies were made. This can be potentially damaging if the unknown copies are later discovered in litigation by an adverse party. Furthermore, in some situations, adverse inferences may be drawn when only select copies of electronic documents are deleted. This problem is particularly acute for electronic documents, where many copies of a particular electronic document may be unknowingly made and stored at intermediate network node locations. As a result of this problem, document management systems have been developed to implement document retention policies for electronic documents. The effectiveness of these systems necessarily depends upon knowing about the existence of all copies of electronic documents and the locations of those copies. With the proliferation of wired and wireless networks, the many different types of network devices, e.g., computers, hand-held devices, personal digital assistants (PDAs), and the many different forms of electronic documents, e.g., email and messages, it is increasingly difficult to track the existence and location of all copies of an electronic document.

Based on the foregoing, there is a need for an approach for deleting electronic documents on network devices that does not suffer from limitations of prior approaches.

SUMMARY

An approach is provided for deleting electronic documents using a document retention policy that specifies one or more deletion criteria for documents belonging to each of a plurality of document classifications. For example, the document retention policy may specify that documents belonging to a particular document classification are to be deleted after a specified time, at a specified time or in response to the occurrence of a particular event. The document retention policy is defined by document retention policy data that is managed by a document retention policy manager. The document retention policy manager disseminates the document retention policy data to one or more network elements over a communications network. The document retention policy manager determines whether a retention policy audit should be performed. If so, then the document retention policy manager signals the one or more network elements to conduct a retention policy audit. The network elements are configured to conduct the retention policy audit by deleting electronic documents in accordance with the document retention policy. The one or more network elements are further configured to generate and provide to the document retention policy manager report data that indicates results of performing the retention policy audit. Automatic or manual loading or auto-destruction code may be used to handle deleting electronic documents from removable media.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ELECTRONIC DOCUMENT MANAGEMENT ARCHITECTURE
III. DOCUMENT RETENTION POLICIES
IV. CREATING, MAINTAINING AND DISTRIBUTING DOCUMENT RETENTION POLICIES
V. ENFORCING A DOCUMENT RETENTION POLICY USING AUDITS
VI. REMOVABLE MEDIA APPLICATIONS
  A. Auto-Loading and Manual Loading
  B. Auto-Destruction Code
VII. IMPLEMENTATION MECHANISMS I. Overview An approach is provided for deleting electronic documents using a document retention policy that specifies one or more deletion criteria for documents belonging to each of a plurality of document classifications. For example, the document retention policy may specify that documents belonging to a particular document classification are to be deleted after a specified time, at a specified time or in response to the occurrence of a particular event. The document retention policy is defined by document retention policy data that is managed by a document retention policy manager. The document retention policy manager disseminates the document retention policy data to one or more network elements over a communications network. The document retention policy manager determines whether a retention policy audit should be performed. If so, then the document retention policy manager signals the one or more network elements to conduct a retention policy audit. The network elements are configured to conduct the retention policy audit by deleting electronic documents in accordance with the document retention policy. The one or more network elements are further configured to generate and provide to the document retention policy manager report data that indicates results of performing the retention policy audit. Automatic or manual loading or auto-destruction code may be used to handle deleting electronic documents from removable media.

II. Electronic Document Management Architecture

Figure 1:
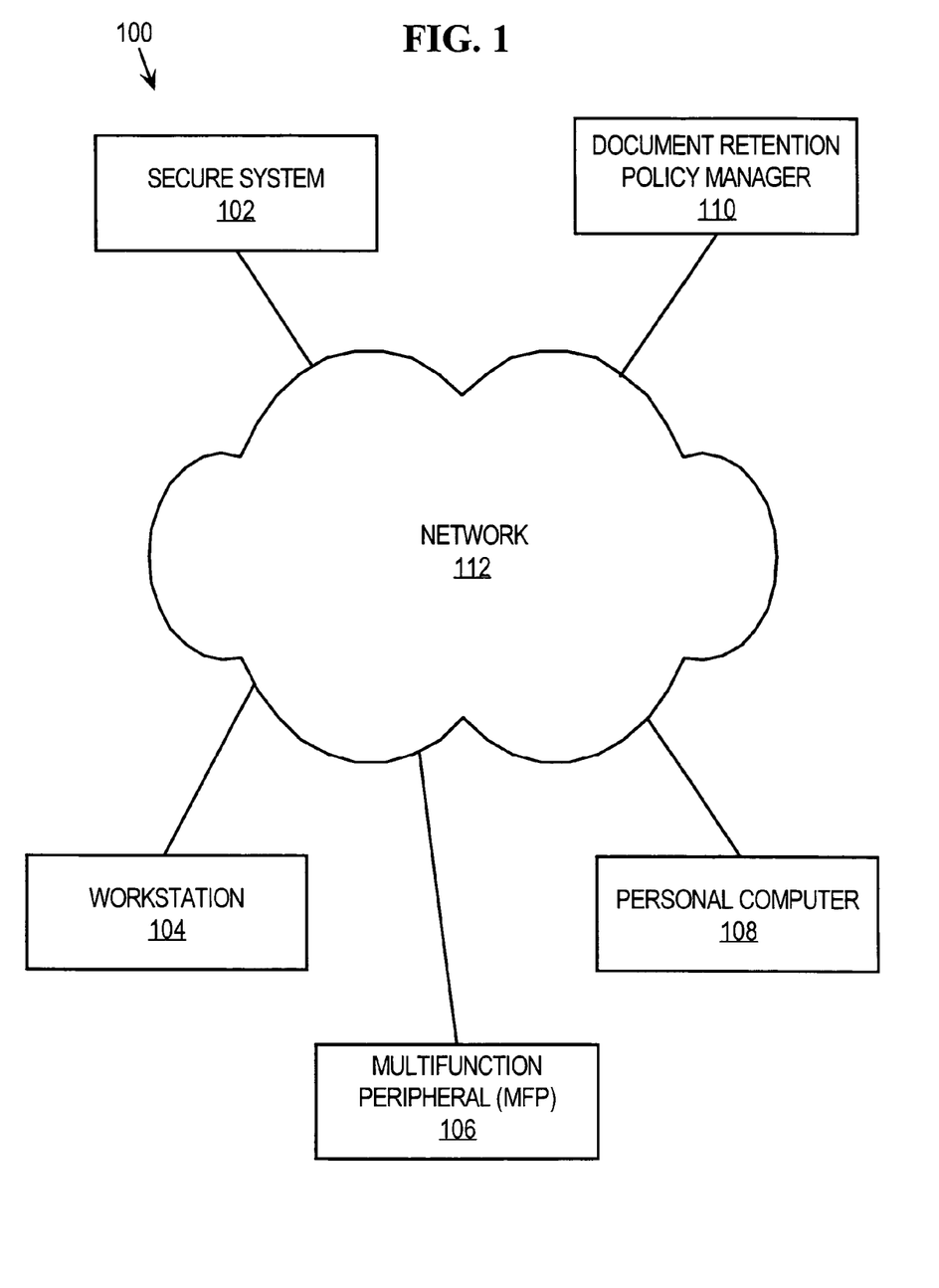
FIG. 1 is a block diagram that depicts an arrangement for deleting electronic documents using a document retention policy according to an embodiment of the invention.

FIG. 1 is a block diagram that depicts an arrangement 100 for deleting electronic documents using a document retention policy according to an embodiment of the invention. Arrangement 100 includes a secure system 102, a workstation 104, a multifunction peripheral (MFP) 106, a personal computer 108 and a document retention policy manager 110 communicatively coupled to a network 112. Network 112 may be implemented by any mechanism or medium that provides for the exchange of information between the elements depicted in FIG. 1. Examples of network 112 include, without limitation, a network such as a Local Area Network (LAN), Wide Area Network (WAN), Ethernet or the Internet, or one or more terrestrial, satellite or wireless links. Although the various elements are depicted in FIG. 1 as being external to network 112, any of these elements may be implemented within network 112, depending upon the requirements of a particular implementation.

Secure system 102 is a system configured to maintain data in a secure manner. For example, secure system 102 may include a gateway or other mechanism for controlling access to data stored in secure system 102. Workstation 104 is any type of workstation and MFP 106 is any device that performs one or more functions, such as printing, copying, facsimile or scanning. Personal computer 108 is any type of personal computer.

Although embodiments of the invention are described herein in the context of managing documents on secure system 102, workstation 104, MFP 106 and personal computer 108, the approach for managing documents is applicable to a wide variety of devices. Other example devices include, without limitation, wired or wireless devices such as personal digital assistants (PDAs), portable or laptop computers and other network devices.

III. Document Retention Policies

Figure 2:
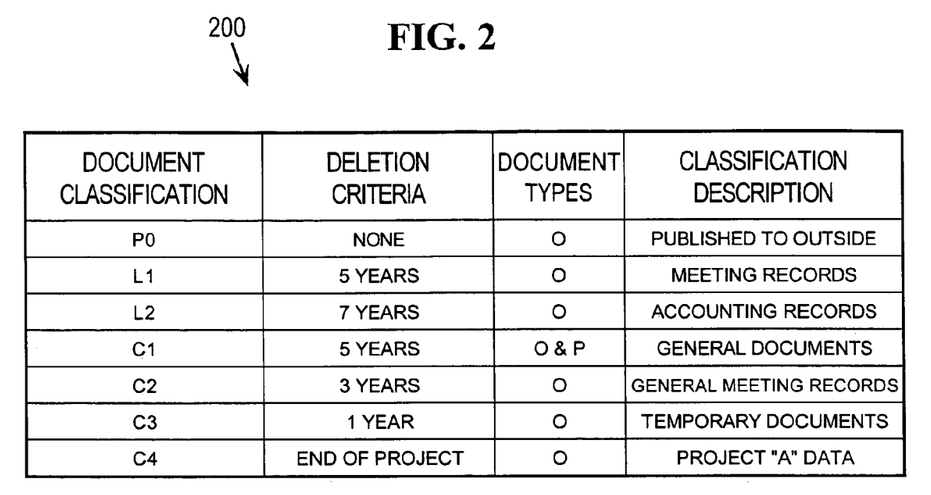
FIG. 2 is a table that depicts example document retention policy data.

According to one embodiment of the invention, a document retention policy specifies one or more deletion criteria for a plurality of electronic document classifications. FIG. 2 is a table 200 that depicts example document retention policy data. FIG. 2 depicts the document retention policy data organized in tabular format for explanation purposes only and the document retention policy data may be stored in any type of data structure or format, depending upon the requirements of a particular implementation. Furthermore, document retention policy data is not limited to the example data depicted in table 200 and may include fewer data types or more data types than depicted in FIG. 2, depending upon the requirements of a particular implementation.

In the example depicted in FIG. 2, table 200 includes a document classification column, a deletion criteria column, a document type column ("O"=official; "P"=private) and a classification description column. Each row of table 200 specifies a retention policy for a particular document classification. For example, the document classification L1 pertains to meeting records and has a document retention policy that specifies that documents in this classification are to be deleted after five years. In this example, the "L" in the document classification "L1" refers to a legal requirement where the length of retention is specified by law. As another example, the document classification C4 pertains to project "A" data and has a document retention policy that specifies that documents in this classification are to be deleted after the project has been completed. In this example, the "C" in the document classification "C4" refers to a corporate standard.

Any number and types of document classifications and deletion criteria may be used, depending upon the requirements of a particular implementation, and the invention is not limited to any particular number or types of document classifications or deletion criteria. For example, as described above, the deletion criteria may specify a time duration that may be applied on a document-by-document basis, based upon the creation date or storage date of the electronic documents. As another example, the deletion criteria may specify a date certain at which all constituent documents of an electronic document classification are to be deleted. As another example, the deletion criteria may specify that all documents associated with an electronic document classification are to be deleted in response to the occurrence of an event. Example events include a notification from administrative personnel and the completion of a project, as described above.

IV. Creating, Maintaining and Distributing Document Retention Policies

Figure 3:
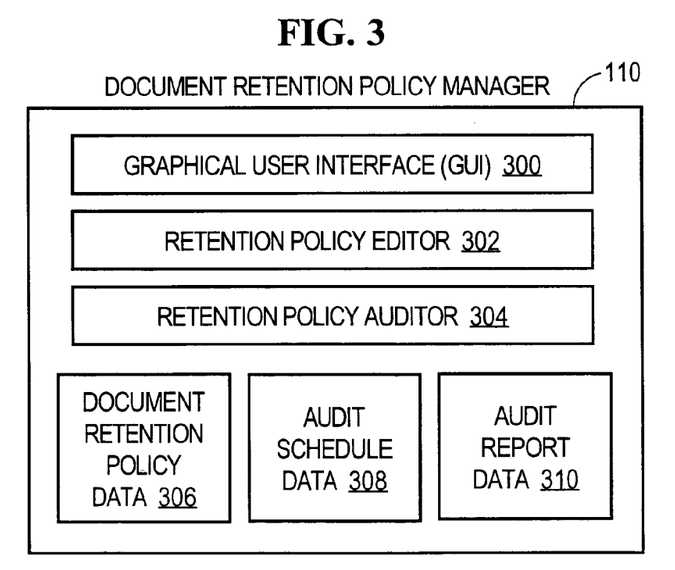
FIG. 3 depicts an example implementation of document retention policy manager.

According to one embodiment of the invention, document retention policy manager 110 provides for the creation and management of document retention policies that are defined by document retention policy data. FIG. 3 depicts an example implementation of document retention policy manager 110. In this example, document retention policy manager 110 is configured with a graphical user interface (GUI) 300, a retention policy editor 302 and a retention policy auditor 304. Document retention policy manager 110 also includes document retention policy data 306, audit schedule data 308 and audit report data 310. Document retention policy data 306 is described in this section, while audit schedule data 308 and audit report data 310 are described in later sections.

Retention policy editor 302 is configured to allow users to create, store and manage document retention policies via GUI 300. For example, retention policy editor 302 allows users to create document retention policy data 306, such as the document retention policy data contained in table 200, through the use of various editing controls. This may include, for example, allowing a user to edit "raw" document retention policy data 306 or display one or more templates on GUI 300 and allow the user to enter data into available fields. Alternatively, a user may retrieve existing document retention policy data 306 from a storage medium. Users may then edit and store the document retention policy data 306. Users may also use the editing controls provided by retention policy editor 302 to delete document retention policy data 306. Document retention policy data 306 may be stored in a volatile memory, such as a random access memory (RAM), and/or stored on a non-volatile memory such as one or more disks, optical media or tape.

According to one embodiment of the invention, document retention policy manager 110 is configured to distribute document retention policy data 306 to secure system 102, workstation 104, MFP 106 and personal computer 108. Document retention policy manager 110 may be configured to automatically provide document retention policy data 306 to those elements that require the data. Document retention policy manager 110 may be configured to query secure system 102, workstation 104, MFP 106 and personal computer 108 to determine which of these elements requires document retention policy data 306. Alternatively, these elements may request document retention policy data 306 from document retention policy manager 110. Furthermore, retention policy auditor 304 may be configured to provide document retention policy data 306 to secure system 102, workstation 104, MFP 106 and personal computer 108 in response to document retention policy data 306 being updated. For example, suppose that a user updates document retention policy data 306 using retention policy editor 302. An administrator may determine that document retention policy data 306 needs to be updated to reflect a change in a document retention policy. According to one embodiment of the invention, retention policy auditor 304 is configured to automatically detect that document retention policy data 306 has been updated and provide the updated document retention policy data 306 to secure system 102, workstation 104, MFP 106 and personal computer 108.

V. Enforcing a Document Retention Policy Using Audits

Document retention policy manager 110 is configured to enforce document retention policies using audits. According to one embodiment of the invention, retention policy auditor 304 is configured to signal one or more of secure system 102, workstation 104, MFP 106 and personal computer 108 to perform an audit. Retention policy auditor 304 may cause audits to be performed in response to user input. For example, administrative personnel may indicate, via GUI 300, that a retention policy audit is to be performed. Retention policy auditor 304 may also cause audits to be performed based upon a schedule specified by audit schedule data 308. In response to receiving the signal to conduct a retention policy audit from retention policy auditor 304, each of these elements conducts an audit. For purposes of explanation, the audit process is described herein with respect secure system 102, although the approach is applicable to the other elements depicted in FIG. 1., namely, workstation 104, MFP 106 and personal computer 108, as well as any other type of element.

Figure 4:
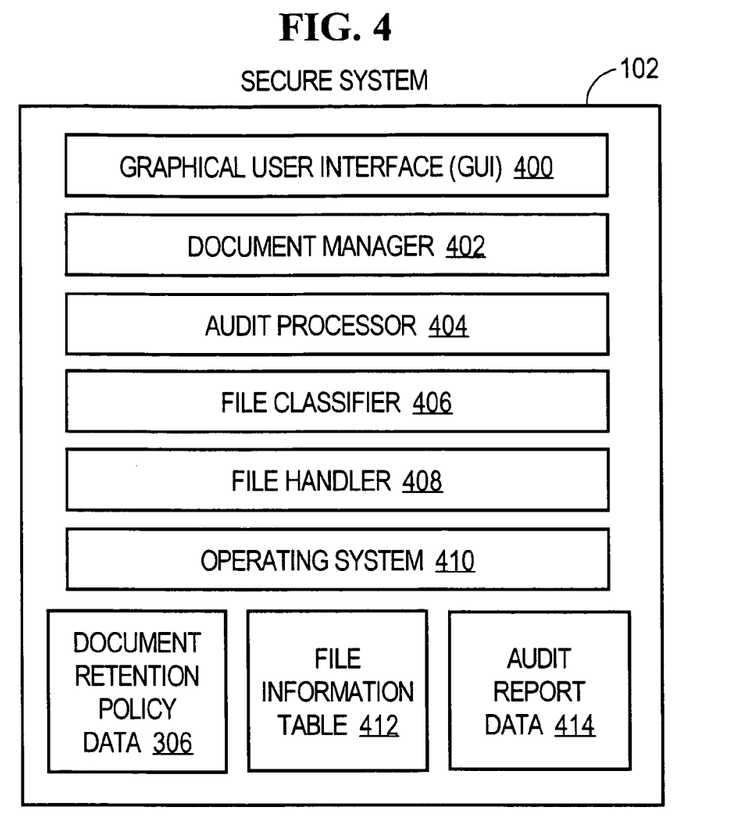
FIG. 4 is a block diagram that depicts an example implementation of secure system.

FIG. 4 is a block diagram that depicts an example implementation of secure system 102. In this example, secure system 102 includes a GUI 400, a document manager 402, an audit processor 404, a file classifier 406, a file handler 408 and an operating system 410. Secure system 102 also includes document retention policy data 306, received from document retention policy manager 110, a file information table 412 and audit report data 414. GUI 400 may be implemented by any mechanism that allows secure system 102 to convey information to a user. Document manager 402 performs a variety of document management tasks for secure system 102. For example, document manager 402 interacts with document retention policy manager 110 to coordinate the request and/or receipt of document retention policy data 306.

According to one embodiment of the invention, when secure system 102 receives an audit signal from document retention policy manager 110, document manager 402 provides the audit signal to audit processor 404. Audit processor 404 examines document retention policy data 306 to identify document classifications for which the corresponding deletion criteria have been satisfied. For example, if at least one year has elapsed since document classification C3 was activated, then the deletion criteria are satisfied and electronic documents associated with document classification C3 are to be deleted. Audit processor 404 then identifies documents stored on secure system 102 that are associated with document classification C3 and causes the identified documents to be deleted from secure system 102.

Figure 5:
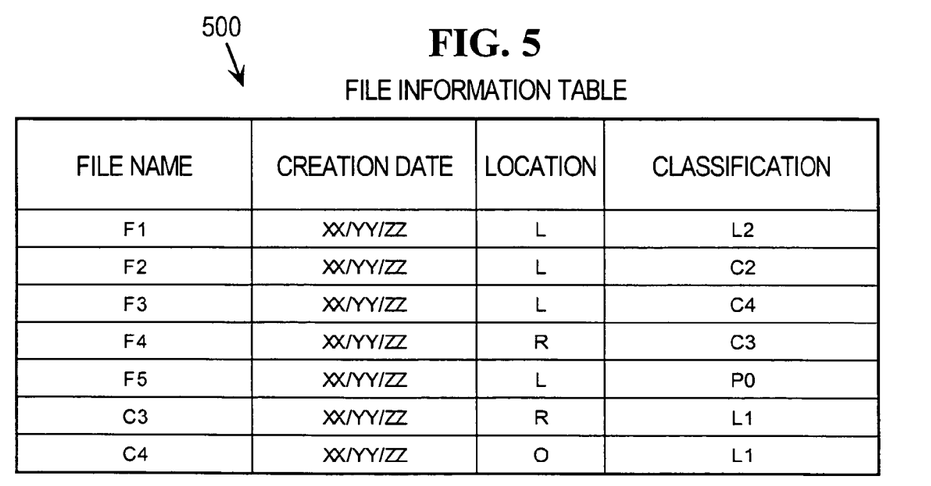
FIG. 5 depicts a file information table, in accordance with an embodiment of the invention.

According to one embodiment of the invention, audit processor 404 uses a file information table, such as the file information table 500 depicted in FIG. 5, to determine which documents are associated with a particular document classification. File information table 500 includes data that indicates, for each electronic document, a file name, a creation data, a location and a classification. The file name is the name of the file that contains the electronic document. The classification is the same as the document classification from table 200. The creation date is the creation date of the file that contains the electronic document. The creation date is useful for identifying particular electronic documents to be deleted on a document-by-document basis. For example, a particular document classification may have associated deletion criteria that specify deletion after one year from creation date of the document. In this situation, different electronic documents that have different creation dates, although all associated with the same particular document classification, are deleted at different times because of their different creation dates. The location indicates whether the file is stored locally on the particular element or on a removable storage media. For example, an "L" indicates that a particular electronic document is stored locally on secure system 102, while an "R" indicates that the particular electronic document is stored on a removable medium or at another location. Additional data may be stored that indicates the particular location of an electronic document. For example, for a file having a location of "R", additional data may be maintained that identifies a particular removable medium where the file is stored. The additional data may specify, for example, a unique identifier of the removable medium.

According to one embodiment of the invention, document manager 402 manages the creation and maintenance of file information table 500. Document manager 402 operates in conjunction with file handler 408 to create and populate file information table 500. For example, file handler 408 detects that a save or copy command has been issued to operating system 410 and in response, creates an entry in file information table 500 for the file that was saved or copied. File handler 408 may also detect that a file name has been changed and update the corresponding file name in file information table 500. File classifier 406 then interacts with a user through GUI 400 to obtain the classification for each file, or to copy the classification of the original file, in the case of a file copy.

After performing a retention policy audit, audit processor 404 causes the generation of audit report data 414 that indicates results of performing the audit. For example, audit report data 414 may indicate files that were deleted in response to deletion criteria being satisfied. Audit report data 414 may also indicate files that could not be deleted, for example, because the files are located on removable medium, such as a floppy disk, a removable disk drive or a portable storage device. Audit processor 404 then causes the audit report data 414 to be provided to document retention policy manager 110.

Figure 6:
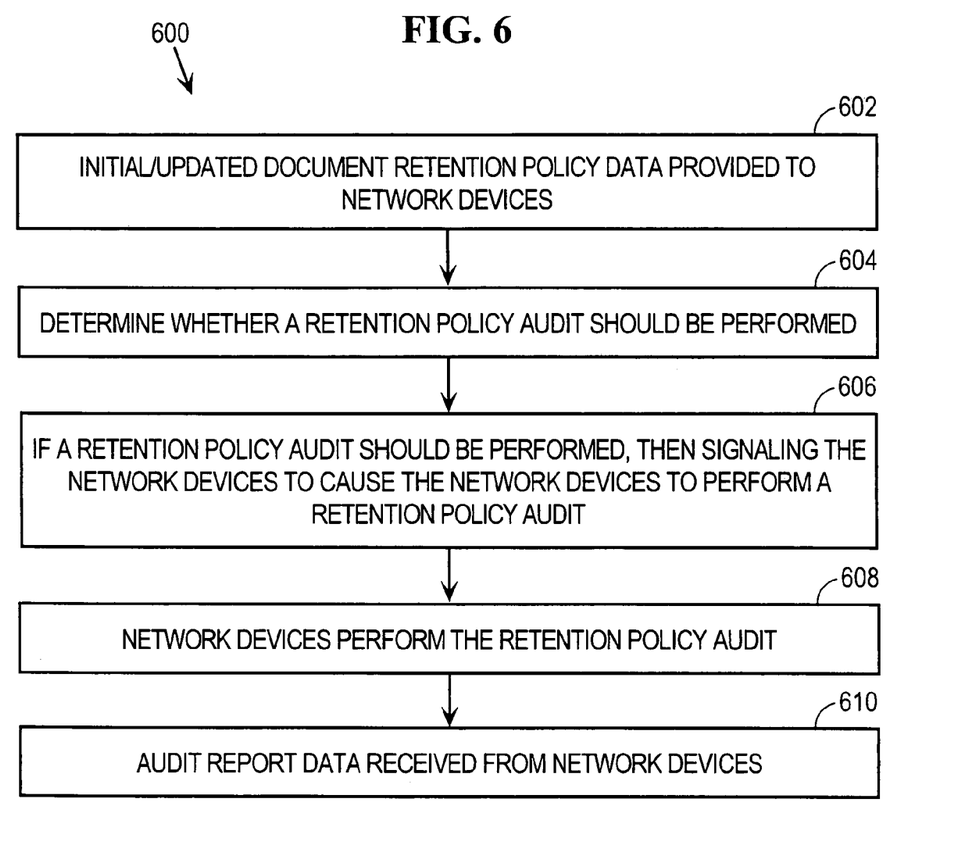
FIG. 6 is a flow diagram that depicts an approach for deleting electronic documents using a document retention policy according to an embodiment of the invention.

FIG. 6 is a flow diagram 600 that depicts an approach for deleting electronic documents using a document retention policy according to an embodiment of the invention. In step 602, initial or updated document retention policy data is provided to network devices. For example, document retention policy manager 110 provides document retention policy data 306 to secure system 102, workstation 104, MFP 106 and personal computer 108 when these devices are initially put into service, and then at other times when document retention policy data 306 is updated.

In step 604, a determination is made whether a retention policy audit should be performed. For example, as described herein, retention policy auditor 304 may determine that a retention policy audit is to be performed in response to user input, based upon audit schedule data 308, or some other criteria.

In step 606, if a retention policy audit is to be performed, then the network devices are signaled to perform a retention policy audit. For example, retention policy auditor 304 signals the audit processor 404 on each network device. In step 608, the network devices perform the retention policy audit. For example, the audit processor 404 in each network device performs the retention policy audit.

In step 610 the network devices generate and provide report data that indicates results of performing the retention policy audit. For example, the audit processor 404 on each network device causes report data to be generated and provided to document retention policy manager 110.

VI. Removable Media Applications

As indicated previously herein, there may be situations where a determination is made that an electronic document is to be deleted according to a document retention policy, but the electronic document is located on a removable medium that is not currently accessible. For example, the removable medium may have been removed from an apparatus that is capable of reading from and/or writing to the removable medium. As described hereinafter, automatic or manual loading or auto-destruction code may be used to address this issue. A file attachment in an electronic email may be considered to be another application of a removable medium. In this application, auto-destruction code may be used as described in more detail hereinafter.

A. Auto-Loading and Manual Loading

According to one embodiment of the invention, an attempt is made to make the removable medium on which the electronic document is stored accessible so that the electronic document can be deleted from the removable medium. For example, an automatic mounting mechanism may be signaled to load the removable medium that contains the electronic document to be deleted. Examples of a removable medium include, without limitation, a tape, optical disk, such as a CD-ROM, DVD, etc., or diskette. If the signaling is successful and the removable medium becomes accessible, then the electronic document is deleted and audit report data 414 is updated accordingly. If the signaling is unsuccessful, then a user may be notified that the removable medium should be made accessible. This may include, for example, generating and sending an electronic notification to administrative personnel or other users. The electronic notification may take a wide variety of forms, such as email, instant message, automated voicemail, facsimile, etc.

As an alternative to signaling an automatic mounting mechanism a user may be notified that the removable medium should be made accessible. The notification may take a wide variety of forms and content, depending upon a particular implementation. For example, a message may be generated for administrative personnel to request that they locate and load a particular removable medium.

Figure 7:
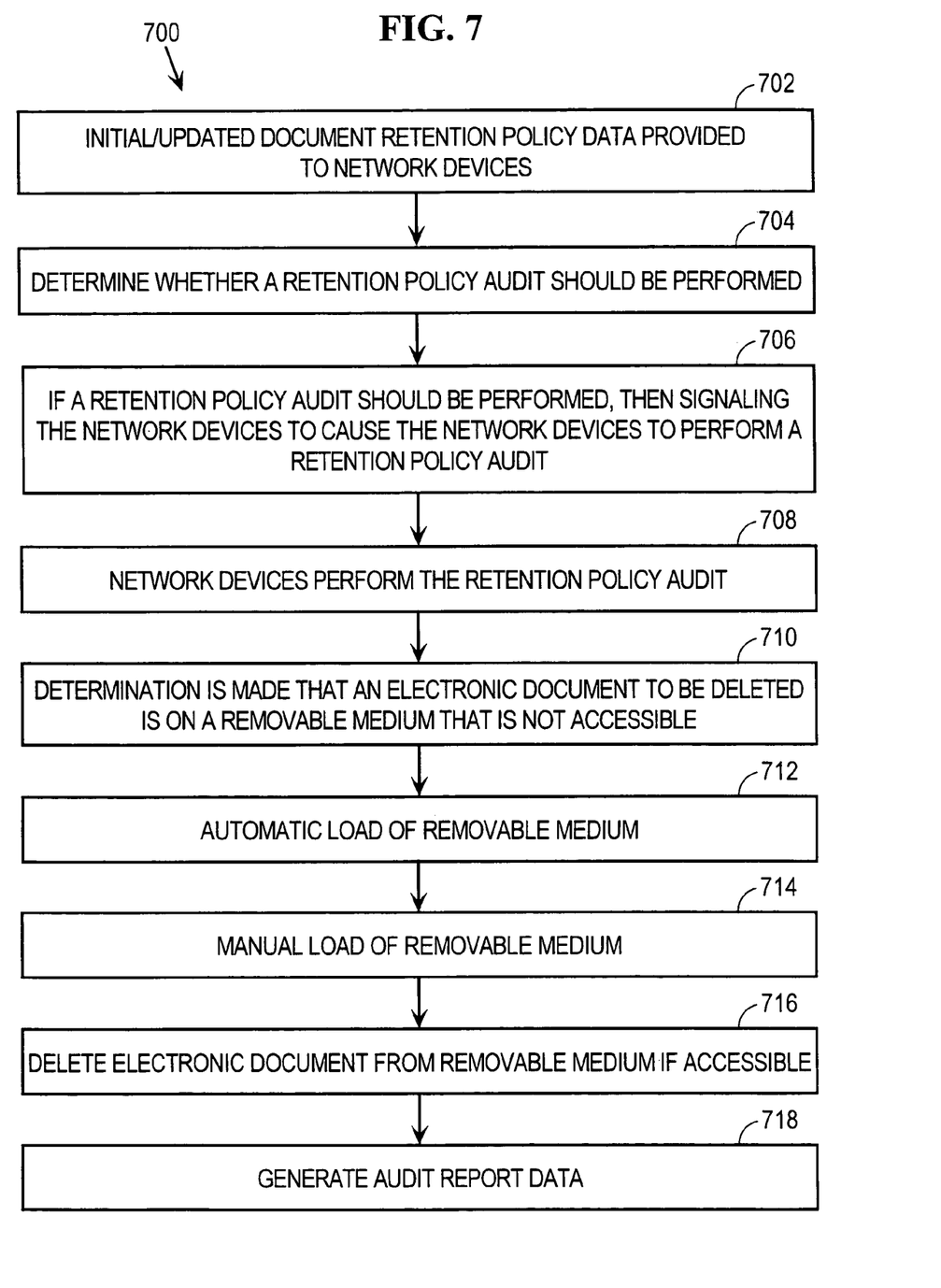
FIG. 7 is a flow diagram that depicts an approach for deleting electronic documents on removable medium using a document retention policy according to an embodiment of the invention.

FIG. 7 is a flow diagram 700 that depicts an approach for deleting electronic documents on a removable media according to an embodiment of the invention. In step 702, initial or updated document retention policy data is provided to network devices. For example, document retention policy manager 110 provides document retention policy data 306 to secure system 102, workstation 104, MFP 106 and personal computer 108 when these devices are initially put into service, and then at other times when document retention policy data 306 is updated.

In step 704, a determination is made whether a retention policy audit should be performed. For example, as described herein, retention policy auditor 304 may determine that a retention policy audit is to be performed in response to user input, based upon audit schedule data 308, or some other criteria.

In step 706, if a retention policy audit is to be performed, then the network devices are signaled to perform a retention policy audit. For example, retention policy auditor 304 signals the audit processor 404 on each network device.

In step 708, the network devices perform the retention policy audit. For example, the audit processor 404 in each network device performs the retention policy audit.

In step 710, a determination is made, based upon the retention policy audit, that a particular electronic document is to be deleted. In the present example, the particular electronic document identified for deletion is stored on a removable medium. This may be determined, for example, by an examination of data contained in file information table 500. If the removable medium is accessible, then the particular electronic document is deleted from the removable medium.

If the removable medium is not accessible, then in step 712, an attempt is made to make the removable medium accessible. This may include, for example, signaling an automatic loading mechanism to load the removable medium into a reader. Alternatively, in step 714, a manual loading of the removable medium may be performed. Either the automatic loading or manual loading of steps 712 and 714 may include notifying a user, such as administrative personnel, to request that the removable medium be made accessible.

In step 716, the particular electronic document is deleted from the removable medium if the removable medium has been made accessible.

In step 718, audit report data 414 is generated that indicates the results of performing the retention policy audit. This may include, for example, whether the particular electronic document was successfully deleted from the removable medium. The audit report data 414 may then be provided to document retention policy manager 110.

B. Auto-Destruction Code

According to one embodiment of the invention, auto-destruction code is used to delete electronic documents stored on removable media that are no longer accessible. This approach is also effective in situations where data is attached to an electronic mail. In general, when an operation is detected for storing an electronic document, a determination is made when the electronic document will be deleted based upon a document retention policy. The electronic document, time data and destruction code are stored on a removable medium. The time data indicates the time at which the electronic document will be deleted based upon the document retention policy. The destruction code is a set of one or more instructions which, when processed by one or more processors, cause the electronic document to be deleted from the removable medium if a current time is on or after the time indicated by the time data.

Figure 8A:
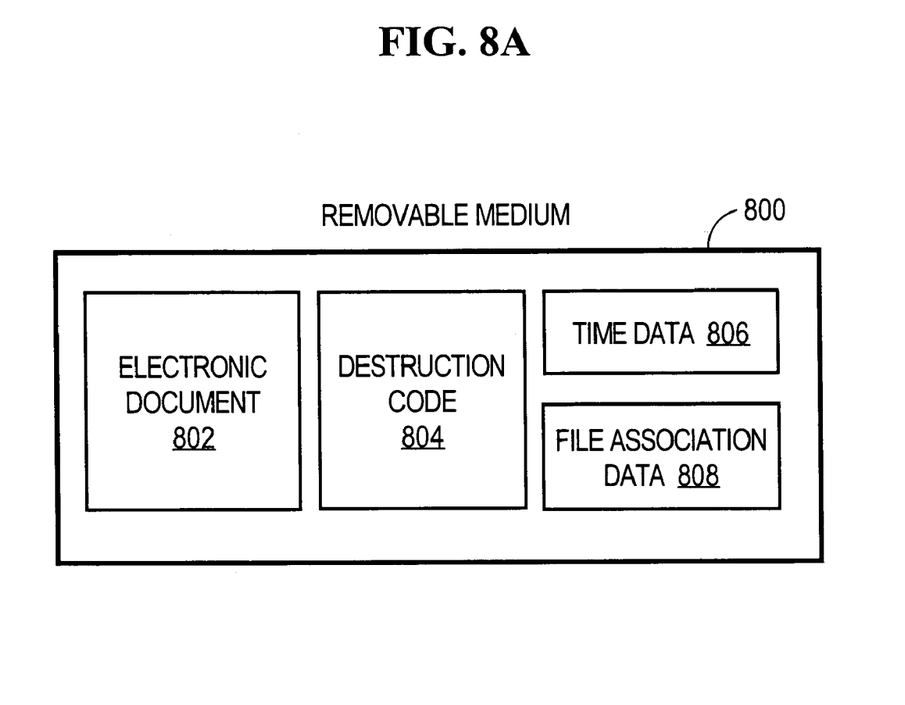
FIGS. 8A and 8B are block diagrams that depict a removable medium containing an electronic document, destruction code, time data and file association data.
Figure 8B:
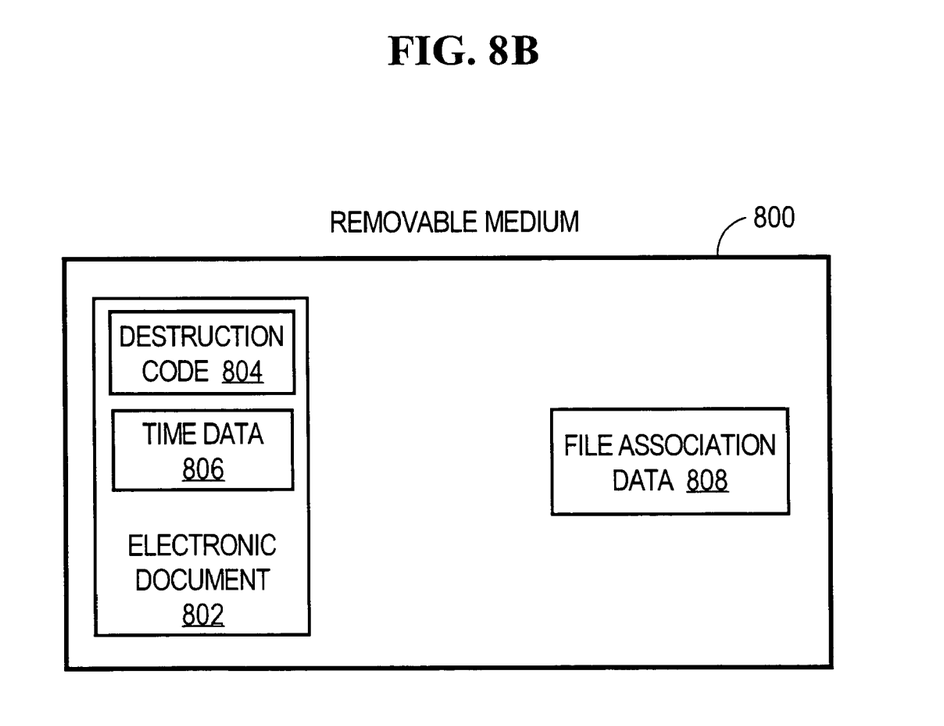

FIG. 8A is a block diagram that depicts a removable medium 800 containing an electronic document 802, destruction code 804 and time data 806. In FIG. 8A, destruction code 804 is depicted as being disposed on removable medium 800 separate from electronic document 802. As depicted in FIG. 8B, destruction code 804 and time data 806 may be included in electronic document 802. Destruction code 804 may be configured in a manner such that when removable medium 800 is inserted into an apparatus with a reading device that is compatible with removable medium 800, that destruction code 804 is processed, causing electronic document 802 to be deleted. For example, many computing apparatuses will attempt to read the contents of a removable medium placed into the computing apparatus. Destruction code 804 may be configured to be processed when this occurs. When destruction code 804 is processed, the electronic document is deleted if a current time is on or after the time indicated by time data 806.

Alternatively, the processing of destruction code 804 may be triggered by an attempt to process electronic document 802. For example, when removable medium 800 is made accessible to a device capable of reading data from removable medium 800, an attempt may be made to process electronic document 802, for example by reading or opening electronic document 802. When this occurs, destruction code 804 is processed and a determination is made whether the current time is on or after the time indicated by time data 806. If so, then destruction code 804 causes electronic document 802 to be deleted. Destruction code 804 may also cause the deletion of itself. In some situations, destruction code 804 will be processed and a determination made that a current time is not on or after the time indicated by time data 806. In this situation, electronic document 802 is not deleted. Destruction code 804 may be processed again at a later time, any number of times, until a determination is made that electronic document 802 is to be deleted. In the situation where destruction code 804 is included with electronic document 802, electronic document 802 may be moved to any number of different locations. Destruction code 804 continues to be executed until a determination is made that electronic document 802 is to be deleted.

File association data 808 is data that causes destruction code 804 to be processed when electronic document 802 is accessed. For example, file association data 808 may be used to re-direct a request to open electronic document 802 and cause destruction code 804 to be processed. In situations where destruction code 804 is included (embedded) in electronic document 802, the use of file association data 808 may not be necessary because accessing electronic document 802 can cause the processing of destruction code 804.

In the context of email, the email itself may be considered to be the removable medium 800. When an email is created and an electronic document is attached to the email, destruction code and time data is included with, attached to, or otherwise embedded in or transported with the email. File association data may also be used in the email context. The destruction code and time data may be carried in the email in a manner so that a user is not aware that the email includes the destruction code and time data. For example, the destruction code and time data (and also the file association data), may be embedded in the header of an email, attached has one or more hidden files, or included in an email using a very small font size or using a color to hide the data from a user. Other techniques may be used to prevent a user from detecting that the email includes destruction code and time data. Opening the electronic document attached to the email causes execution of the destruction code and a current time is compared to the time indicated by the time data. If the current time is on or after the time indicated by the time data, then the destruction code causes the deletion of the electronic document.

Figure 9:
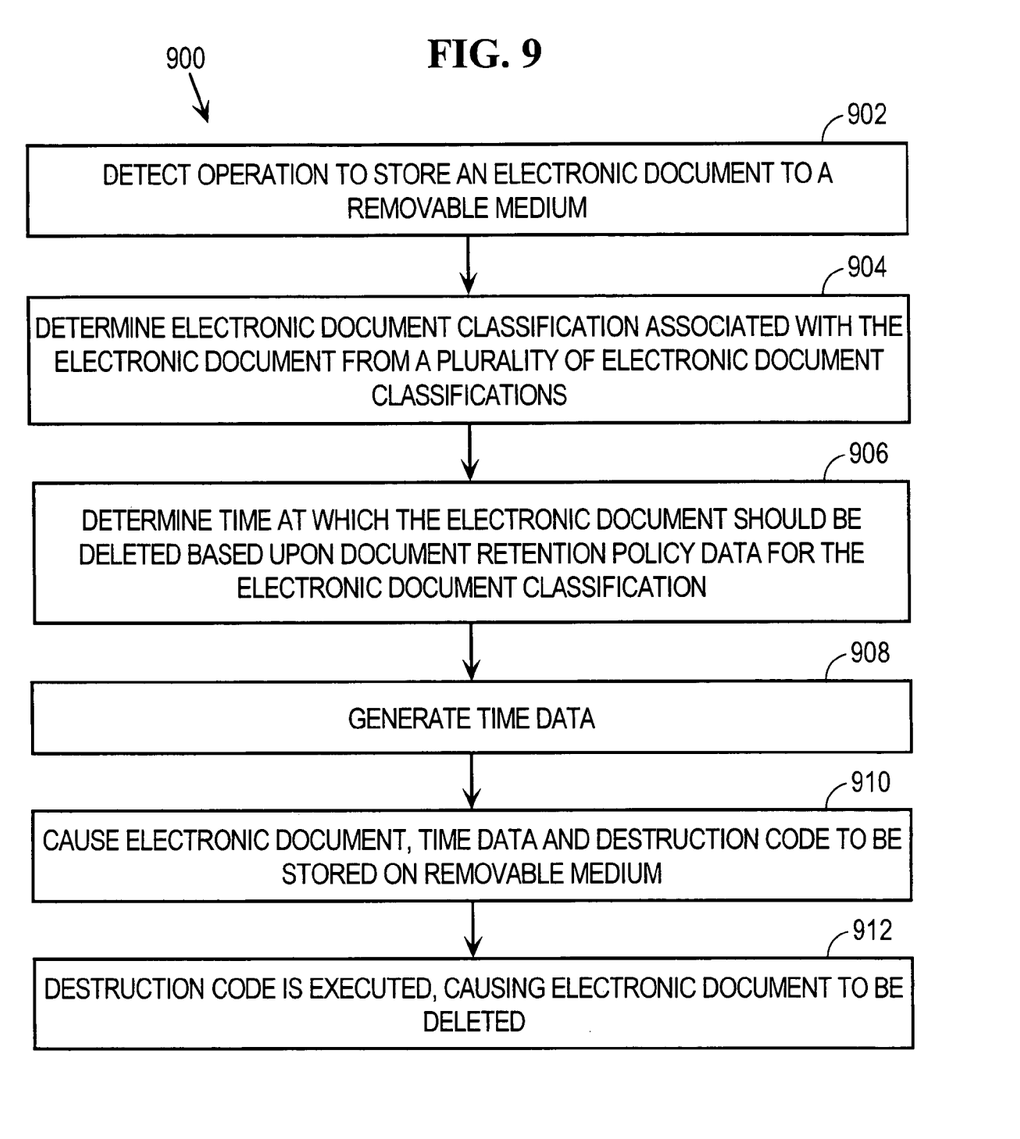
FIG. 9 is a flow diagram that depicts an approach for deleting electronic documents on removable medium using a document retention policy according to an embodiment of the invention.

FIG. 9 is a flow diagram 900 that depicts an approach for deleting electronic documents on a removable media according to an embodiment of the invention. In step 902, an operation is detected to store an electronic document on a removable medium.

In step 904, an electronic document classification associated with the electronic document is determined from a plurality of electronic document classifications. This may be accomplished, for example, by referring to file information table 500 and identifying the electronic document classification that corresponds to the electronic document.

In step 906, a determination is made of a time at which the electronic document should be deleted based upon document retention policy data for the electronic document classification. The document retention policy data specifies one or more deletion criteria for the electronic document classification.

In step 908, time data is generated that indicates the time at which the electronic document should be deleted based upon the document retention policy.

In step 910, the electronic document, the time data and destruction code are stored to the removable medium. The destruction code is a set of one or more instructions which, when processed by one or more processors, cause the deletion of the electronic document. As previously described herein, the destruction code may be stored on the removable medium separate from or as part of the electronic document. File association data 808 may also be generated and stored on the removable medium, depending upon the requirements of a particular implementation.

In step 912, the destruction code is processed and the electronic document is deleted. As described above, the destruction code may cause the deletion of the electronic document in any location, regardless of whether the electronic document has been moved from the removable medium to another location.

VII. Implementation Mechanisms

The approach described herein for deleting electronic documents using a document retention policy is applicable to any type of data and not just electronic documents. For example, the approach is applicable to emails, message data and audio/video data. With respect to removable media applications, there may be situations where controls are used when data is written to removable media. For example, in situations where data is to be written to a Write Once Read Many (WORM) medium, a decision may be made to prevent the data from being written, because it may not be possible to delete the data from the WORM medium using document retention policies as described herein.

Figure 10:
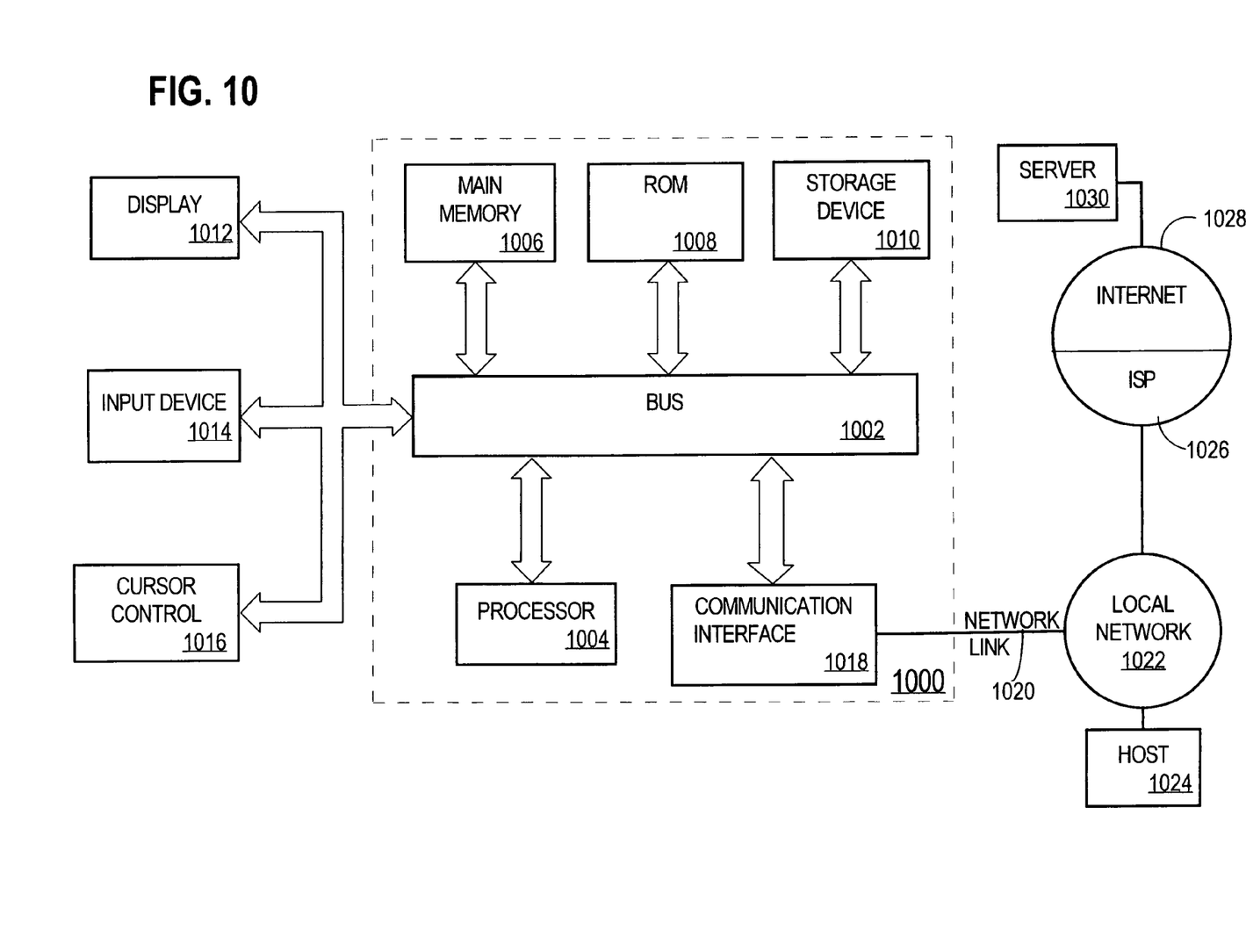
FIG. 10 is a block diagram of a computer system on which embodiments of the invention may be implemented.

FIG. 10 is a block diagram that illustrates an example computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for deleting electronic documents, the computer-implemented method comprising:
   at a network device, receiving a signal indicating that a retention policy audit should be conducted;
   in response to the signal, performing the retention policy audit on the network device by
      retrieving document retention policy data that specifies, for each of a plurality of electronic document classifications, one or more corresponding electronic document types and one or more deletion criteria that include a time duration that specifies how long electronic documents that are associated with the electronic document classification and that are the same type as the one or more corresponding electronic document types should be maintained,
      identifying, from the plurality of electronic document classifications, one or more electronic document classifications for which the corresponding time duration is satisfied,
      identifying one or more electronic documents that are both associated with the identified one or more electronic document classifications and that are the same type as the one or more corresponding electronic document types,
      causing the deletion of the one or more electronic documents that are both associated with the identified one or more electronic document classifications and of the one or more corresponding electronic document types, and
      generating audit report data that indicates results of performing the retention policy audit; and
   if a determination is made that an electronic document that is both associated with the identified one or more electronic document classifications and of the one or more corresponding electronic document types is stored on a removable medium that is not currently accessible, then
      attempting to cause the removable medium to be made accessible, and if the removable medium can be made accessible, then
         causing the electronic document to be deleted from the removable medium, and
         updating the audit report data to indicate that the electronic document was deleted.

2. The computer-implemented method as recited in claim 1, wherein attempting to cause the removable medium to be made accessible includes signaling an automatic mounting mechanism to request that the removable medium be made accessible.

3. The computer-implemented method as recited in claim 1, further comprising if the removable medium cannot be made accessible, then signaling a user to request that the removable medium be made accessible.

4. A computer-readable volatile or non-volatile storage medium for deleting electronic documents, the computer-readable volatile or non-volatile storage medium storing instructions which, when processed by one or more processors, cause:
   at a network device, receiving a signal indicating that a retention policy audit should be conducted;
   in response to the signal, performing the retention policy audit on the network device by
      retrieving document retention policy data that specifies, for each of a plurality of electronic document classifications, one or more corresponding electronic document types and one or more deletion criteria that include a time duration that specifies how long electronic documents that are associated with the electronic document classification and that are of the one or more corresponding electronic document types should be maintained,
      identifying, from the plurality of electronic document classifications, one or more electronic document classifications for which the corresponding time duration is satisfied,
      identifying one or more electronic documents that are both associated with the identified one or more electronic document classifications and that are the same type as the one or more corresponding electronic document types,
      causing the deletion of the one or more electronic documents that are both associated with the identified one or more electronic document classifications and of the one or more corresponding electronic document types, and
      generating audit report data that indicates results of performing the retention policy audit; and
   if a determination is made that an electronic document that is both associated with the identified one or more electronic document classifications and of the one or more corresponding electronic document types is stored on a removable medium that is not currently accessible, then
      attempting to cause the removable medium to be made accessible, and if the removable medium can be made accessible, then
         causing the electronic document to be deleted from the removable medium, and
         updating the audit report data to indicate that the electronic document was deleted.

5. The computer-readable volatile or non-volatile storage medium as recited in claim 4, wherein attempting to cause the removable medium to be made accessible includes signaling an automatic mounting mechanism to request that the removable medium be made accessible.

6. The computer-readable volatile or non-volatile storage medium as recited in claim 4, further storing additional instructions which, when processed by the one or more processors, cause if the removable medium cannot be made accessible, then signaling a user to request that the removable medium be made accessible.

7. An apparatus for deleting electronic documents, the apparatus configured to:
> at a network device, receiving a signal indicating that a retention policy audit should be conducted;
> in response to the signal, performing the retention policy audit on the network device by
> > retrieving document retention policy data that specifies, for each of a plurality of electronic document classifications, one or more corresponding electronic document types and one or more deletion criteria that include a time duration that specifies how long electronic documents that are associated with the electronic document classification and that are of the one or more corresponding electronic document types should be maintained,
> > identifying, from the plurality of electronic document classifications, one or more electronic document classifications for which the corresponding time duration is satisfied,
> > identifying one or more electronic documents that are both associated with the identified one or more electronic document classifications and that are the same type as the one or more corresponding electronic document types,
> > causing the deletion of the one or more electronic documents that are both associated with the identified one or more electronic document classifications and of the one or more corresponding electronic document types, and
> > generating audit report data that indicates results of performing the retention policy audit; and
> if a determination is made that an electronic document that is both associated with the identified one or more electronic document classifications and of the one or more corresponding electronic document types is stored on a removable medium that is not currently accessible, then
> > attempting to cause the removable medium to be made accessible, and if the removable medium can be made accessible, then
> > > causing the electronic document to be deleted from the removable medium, and
> > > updating the audit report data to indicate that the electronic document was deleted.

8. The apparatus as recited in claim 7, wherein attempting to cause the removable medium to be made accessible includes signaling an automatic mounting mechanism to request that the removable medium be made accessible.

9. The apparatus as recited in claim 7, wherein the apparatus is further configured to if the removable medium cannot be made accessible, then signaling a user to request that the removable medium be made accessible.

10. A computer-implemented method for deleting electronic documents, the computer-implemented method comprising:
> in response to detecting an operation to store an electronic document on a removable medium,
> > determining, from a plurality of electronic document classifications, an electronic document classification that has one or more corresponding electronic document types, at least one of which is the same type as the electronic document,
> > determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types,
> > generating time data that indicates the time at which the one or more deletion criteria will be satisfied,
> > causing the electronic document to be stored on the removable medium,
> > causing the time data to be stored on the removable medium,
> > generating a set of one or more instructions which, when processed by one or more processors, cause the deletion of the electronic document from the removable medium on or after the time indicated by the time data, and
> > causing the set of one or more instructions to be stored on the removable medium.

11. The computer-implemented method as recited in claim 10, wherein the set of one or more instructions are stored on the removable medium in a manner such that the set of one or more instructions are processed when the removable medium is inserted into an apparatus capable of processing the set of one or more instructions.

12. The computer-implemented method as recited in claim 10, wherein the set of one or more instructions are stored on the removable medium in a manner such that the set of one or more instructions are processed when the electronic document is accessed.

13. The computer-implemented method as recited in claim 10, wherein the electronic document and the set of one or more instructions are stored together in a single file.

14. The computer-implemented method as recited in claim 10, further comprising causing file association data to be generated and stored on the removable medium, wherein the file association data causes the set of one or more instructions to be processed when the electronic document is accessed.

15. A computer-readable volatile or non-volatile storage medium for deleting electronic documents, the computer-readable volatile or non-volatile storage medium storing instructions which, when processed by one or more processors, cause:
> in response to detecting an operation to store an electronic document on a removable medium,
> > determining, from a plurality of electronic document classifications, an electronic document classification that has one or more corresponding electronic document types, at least one of which is the same type as the electronic document,
> > determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types,
> > generating time data that indicates the time at which the one or more deletion criteria will be satisfied,
> > causing the electronic document to be stored on the removable medium,
> > causing the time data to be stored on the removable medium,
> > generating a set of one or more instructions which, when processed by one or more processors, cause the deletion of the electronic document from the removable medium on or after the time indicated by the time data, and causing the set of one or more instructions to be stored on the removable medium.

16. The computer-readable volatile or non-volatile storage medium as recited in claim 15, wherein the set of one or more instructions are stored on the removable medium in a manner such that the set of one or more instructions are processed when the removable medium is inserted into an apparatus capable of processing the set of one or more instructions.

17. The computer-readable volatile or non-volatile storage medium as recited in claim 15, wherein the set of one or more instructions are stored on the removable medium in a manner such that the set of one or more instructions are processed when the electronic document is accessed.

18. The computer-readable volatile or non-volatile storage medium as recited in claim 15, wherein the electronic document and the set of one or more instructions are stored together in a single file.

19. The computer-readable volatile or non-volatile storage medium as recited in claim 15, further comprising additional instructions which, when processed by the one or more processors, cause file association data to be generated and stored on the removable medium, wherein the file association data causes the set of one or more instructions to be processed when the electronic document is accessed.

20. An apparatus for deleting electronic documents, the apparatus configured to:

in response to detecting an operation to store an electronic document on a removable medium, determining, from a plurality of electronic document classifications, an electronic document classification that has one or more corresponding electronic document types, at least one of which is the same type as the electronic document, determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types, generating time data that indicates the time at which the one or more deletion criteria will be satisfied, causing the electronic document to be stored on the removable medium, causing the time data to be stored on the removable medium, generating a set of one or more instructions which, when processed by one or more processors, cause the deletion of the electronic document from the removable medium on or after the time indicated by the time data, and causing the set of one or more instructions to be stored on the removable medium.

21. The apparatus as recited in claim 20, wherein the set of one or more instructions are stored on the removable medium in a manner such that the set of one or more instructions are processed when the removable medium is inserted into an apparatus capable of processing the set of one or more instructions.

22. The apparatus as recited in claim 20, wherein the set of one or more instructions are stored on the removable medium in a manner such that the set of one or more instructions are processed when the electronic document is accessed.

23. The apparatus as recited in claim 20, wherein the electronic document and the set of one or more instructions are stored together in a single file.

24. The apparatus as recited in claim 20, wherein the apparatus if further configured to cause file association data to be generated and stored on the removable medium, wherein the file association data causes the set of one or more instructions to be processed when the electronic document is accessed.

25. A computer-implemented method for deleting electronic documents, the computer-implemented method comprising:

in response to detecting an operation to attach an electronic document to an email, determining, from a plurality of electronic document classifications, an electronic document classification that has one or more corresponding electronic document types, at least one of which is the same type as the electronic document, determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types, generating time data that indicates the time at which the one or more deletion criteria will be satisfied, causing the electronic document to be attached to the email, causing the time data to be included with the email, generating a set of one or more instructions which, when processed by one or more processors, cause the deletion of the electronic document on or after the time indicated by the time data, and causing the set of one or more instructions to be included with the email.

26. The computer-implemented method as recited in claim 25, wherein the set of one or more instructions are included with the email in a manner such that the set of one or more instructions are processed when the electronic document is accessed.

27. The computer-implemented method as recited in claim 25, wherein the electronic document and the set of one or more instructions are stored together in a single file.

28. The computer-implemented method as recited in claim 25, further comprising causing file association data to be generated and included with the email, wherein the file association data causes the set of one or more instructions to be processed when the electronic document is accessed.

29. A computer-readable volatile or non-volatile storage medium for deleting electronic documents, the computer-readable volatile or non-volatile storage medium storing instructions which, when processed by one or more processors, cause:

in response to detecting an operation to attach an electronic document to an email, determining, from a plurality of electronic document classifications, an electronic document classification that has one or more corresponding electronic document types, at least one of which is the same type as the electronic document, determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types, generating time data that indicates the time at which the one or more deletion criteria will be satisfied, causing the electronic document to be attached to the email, causing the time data to be included with the email, generating a set of one or more instructions which, when processed by one or more processors, cause the deletion of the electronic document on or after the time indicated by the time data, and causing the set of one or more instructions to be included with the email.

30. The computer-readable volatile or non-volatile storage medium as recited in claim 29, wherein the set of one or more instructions are included with the email in a manner such that the set of one or more instructions are processed when the electronic document is accessed.

31. The computer-readable volatile or non-volatile storage medium as recited in claim 29, wherein the electronic document and the set of one or more instructions are stored together in a single file.

32. The computer-readable volatile or non-volatile storage medium as recited in claim 29, further comprising additional instructions which, when processed by the one or more processors, cause file association data to be generated and stored with the email, wherein the file association data causes the set of one or more instructions to be processed when the electronic document is accessed.

33. An apparatus for deleting electronic documents, the apparatus configured to:

in response to detecting an operation to attach an electronic document to an email, determining, from a plurality of electronic document classifications, an electronic document classification that has one or more corresponding electronic document types, at least one of which is the same type as the electronic document, determining a time at which one or more deletion criteria will be satisfied based upon document retention policy data that specifies one or more deletion criteria for the electronic document classification, wherein the one or more deletion criteria include a time duration that specifies how long electronic documents should be maintained that are both associated with the electronic document classification and that are the same type as the one or more corresponding electronic document types, generating time data that indicates the time at which the one or more deletion criteria will be satisfied, causing the electronic document to be attached to the email, causing the time data to be included with the email, generating a set of one or more instructions which, when processed by one or more processors, cause the deletion of the electronic document from the removable medium on or after the time indicated by the time data, and causing the set of one or more instructions to be included with the email.

34. The apparatus as recited in claim 33, wherein the set of one or more instructions are stored on the removable medium in a manner such that the set of one or more instructions are processed when the electronic document is accessed.

35. The apparatus as recited in claim 33, wherein the electronic document and the set of one or more instructions are stored together in a single file.

36. The apparatus as recited in claim 33, wherein the apparatus if further configured to cause file association data to be generated and included with the email, wherein the file association data causes the set of one or more instructions to be processed when the electronic document is accessed.

* * * * *